United States Patent
Ghanbari et al.

(10) Patent No.: US 11,854,313 B2
(45) Date of Patent: Dec. 26, 2023

(54) SYSTEMS AND METHODS FOR USING ON-BOARD RESOURCES OF INDIVIDUAL VEHICLES IN A FLEET OF VEHICLES AS A DISTRIBUTED DATA CENTER

(71) Applicant: SmartDrive Systems, Inc., Westlake, TX (US)

(72) Inventors: Reza Ghanbari, San Diego, CA (US); Nicholas Shayne Brookins, Encinitas, CA (US); David Forney, La Jolla, CA (US); Mark Freitas, San Diego, CA (US); Daniel Andrew Deninger, Carlsbad, CA (US); Jeffrey Griswold, San Diego, CA (US); Jason Palmer, Carlsbad, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 0 days.

(21) Appl. No.: 18/152,013

(22) Filed: Jan. 9, 2023

(65) Prior Publication Data
US 2023/0162538 A1    May 25, 2023

Related U.S. Application Data

(63) Continuation of application No. 17/690,695, filed on Mar. 9, 2022, now Pat. No. 11,587,371, which is a
(Continued)

(51) Int. Cl.
*G06F 15/16* (2006.01)
*G07C 5/00* (2006.01)
(Continued)

(52) U.S. Cl.
CPC ............ *G07C 5/008* (2013.01); *G06F 16/27* (2019.01); *G06F 16/903* (2019.01);
(Continued)

(58) Field of Classification Search
CPC ....... G07C 5/008; G07C 5/0841; G06F 16/27; G06F 16/903; H04L 67/1097; H04L 67/12; H04L 67/567; H04W 4/44
See application file for complete search history.

(56) References Cited

U.S. PATENT DOCUMENTS 6,735,630 B1    5/2004 Gelvin
6,812,888 B2    11/2004 Drury
(Continued)

FOREIGN PATENT DOCUMENTS

WO    2017079229 A1    5/2017

OTHER PUBLICATIONS

Choo Sukjin et al: "Reliable vehicle 1-15 selection algorithm with dynamic mobility of vehicle in vehicular cloud system", 2017 19th Asia-Pacific Network Operations and Managements Ymposium (APNOMS), IEEE, Sep. 27, 2017 (Sep. 27, 2017), pp. 319-321, XP033243401, DOI: 10.1109/APNOMS.2017.8094155.
(Continued)

*Primary Examiner* — Richard G Keehn
(74) *Attorney, Agent, or Firm* — ESPLIN & ASSOCIATES, PC

(57) ABSTRACT

This disclosure relates to a distributed data center that includes resources carried by a fleet of vehicles. The system includes sensors configured to generate output signals conveying information related to the vehicles. The system may detect vehicle events based on the information conveyed by the output signals. The system includes a remote computing server configured to present a user interface to a user. Through the user interface, the user may query information from one or more vehicles in the fleet. The distributed query is transmitted to individual vehicles, and results are locally
(Continued)

processed in accordance with response constraints and subsequently transmitted back to the remote computing server for presentation to the user.

13 Claims, 6 Drawing Sheets

Related U.S. Application Data continuation of application No. 17/187,548, filed on Feb. 26, 2021, now Pat. No. 11,321,969, which is a continuation of application No. 16/676,133, filed on Nov. 6, 2019, now Pat. No. 10,937,255, which is a continuation of application No. 16/158,124, filed on Oct. 11, 2018, now Pat. No. 10,482,686, which is a continuation of application No. 15/958,636, filed on Apr. 20, 2018, now Pat. No. 10,102,691.

(51) Int. Cl.
| | | |
|---|---|---|
| *H04L 67/1097* | (2022.01) | |
| *G06F 16/27* | (2019.01) | |
| *G06F 16/903* | (2019.01) | |
| *H04L 67/12* | (2022.01) | |
| *H04W 4/44* | (2018.01) | |
| *H04L 67/567* | (2022.01) | |
| *G07C 5/08* | (2006.01) | |

(52) U.S. Cl.
CPC .......... *H04L 67/1097* (2013.01); *H04L 67/12* (2013.01); *H04L 67/567* (2022.05); *H04W 4/44* (2018.02); *G07C 5/0841* (2013.01)

(56) References Cited

U.S. PATENT DOCUMENTS

| | | | |
|---|---|---|---|
| 6,889,831 B2 | 5/2005 | Pike | |
| 7,020,701 B1 | 3/2006 | Gelvin | |
| 7,489,993 B2 | 2/2009 | Coffee | |
| 7,715,961 B1 | 5/2010 | Kargupta | |
| 10,102,691 B1 | 10/2018 | Ghanbari | |
| 10,482,686 B2 | 11/2019 | Ghanbari | |
| 10,607,425 B2 | 3/2020 | Kwak | |
| 10,789,788 B1 | 9/2020 | Ghanbari | |
| 10,818,175 B2 | 10/2020 | Brookins | |
| 10,930,092 B2 | 2/2021 | Ghanbari | |
| 10,937,255 B2 | 3/2021 | Ghanbari | |
| 11,321,969 B2 | 5/2022 | Ghanbari | |
| 11,586,194 B2* | 2/2023 | Bielby | ............. G06F 9/5061 |
| 2005/0156715 A1 | 7/2005 | Zou | |
| 2015/0269790 A1 | 9/2015 | Batcheller | |
| 2016/0140872 A1* | 5/2016 | Palmer | ............. G06V 20/56 |
| | | | 434/65 |
| 2016/0247109 A1 | 8/2016 | Scicluna | |
| 2016/0300402 A1 | 10/2016 | Nassar | |
| 2017/0023945 A1 | 1/2017 | Cavalcanti | |
| 2017/0169625 A1* | 6/2017 | Lavie | ............. H04L 67/55 |
| 2017/0292845 A1 | 10/2017 | Yamasaki | |
| 2017/0330397 A1 | 11/2017 | Palmer | |
| 2017/0351990 A1 | 12/2017 | Hecht | |
| 2018/0005407 A1* | 1/2018 | Browning | ............. G06V 20/588 |
| 2018/0188044 A1 | 7/2018 | Wheeler | |
| 2018/0188045 A1 | 7/2018 | Wheeler | |
| 2019/0238638 A1 | 8/2019 | Way | |
| 2019/0325665 A1 | 10/2019 | Ghanbari | |
| 2019/0325745 A1 | 10/2019 | Brookins | |
| 2020/0074764 A1 | 3/2020 | Ghanbari | |
| 2020/0302703 A1 | 9/2020 | Ghanbari | |
| 2021/0074156 A1 | 3/2021 | Brookins | |
| 2021/0133695 A1 | 5/2021 | Nichols | |
| 2021/0174608 A1 | 6/2021 | Ghanbari | |
| 2021/0201600 A1 | 7/2021 | Ghanbari | |
| 2021/0326563 A1 | 10/2021 | Kossor | |
| 2022/0198841 A1 | 6/2022 | Ghanbari | |
| 2022/0232503 A1 | 7/2022 | Cheng | |

OTHER PUBLICATIONS

International Search Report and Written Opinion for PCTUS1927860, dated Jul. 10, 2019; 12 pages.

* cited by examiner

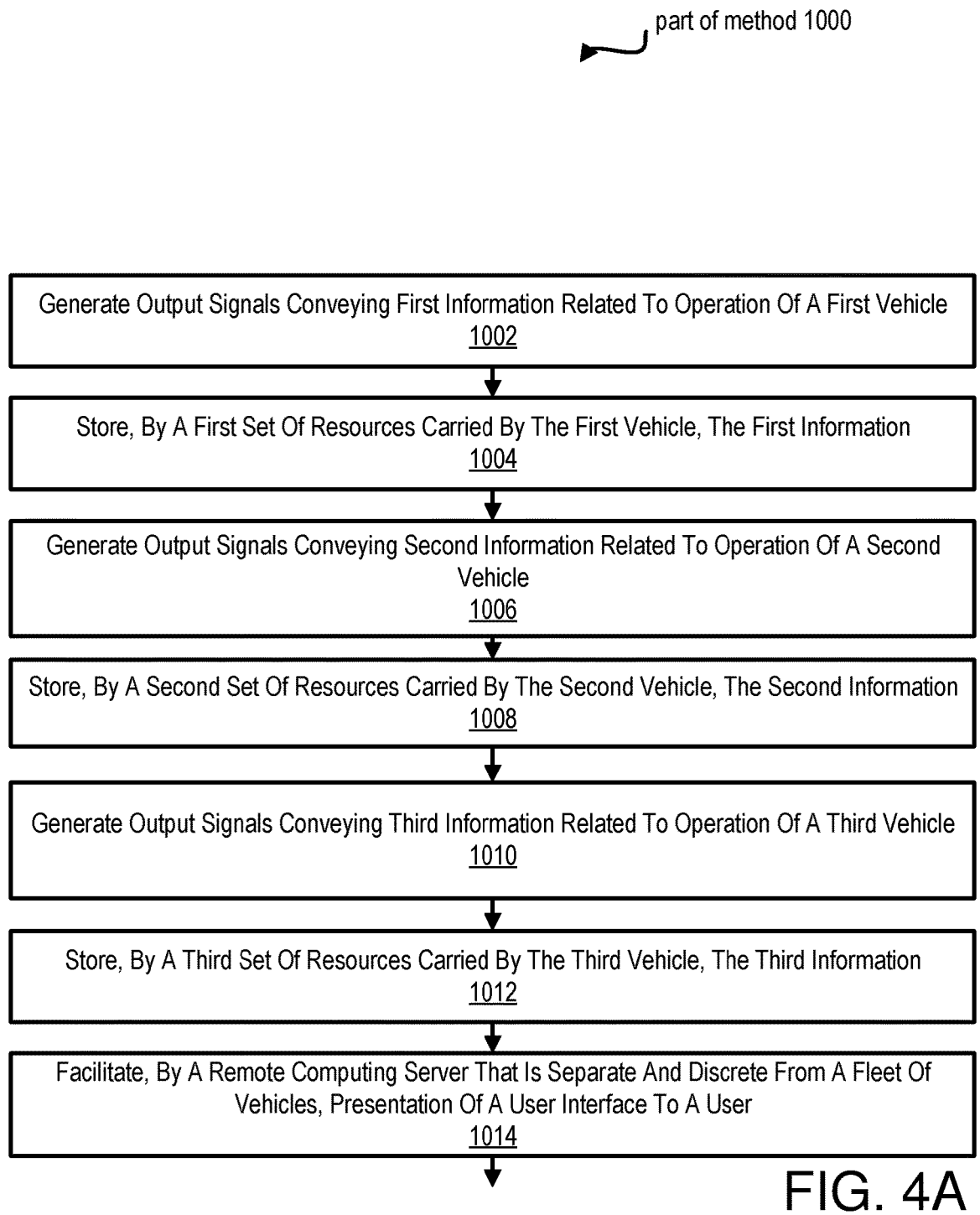

Continued from previous figure, see Fig. 4A

← part of method 1000

```
Receive Input, Which Represents A Distributed Query Related To Operation Of A Fleet Of
Vehicles Including The First, Second, And Third Vehicle From The User Through The User
Interface
1016
```

```
Transmit Wirelessly Query Information, Based On The Distributed Query, From The Remote
Computing Server To A Subset Of The Fleet Of Vehicles, Wherein The Subset Includes The First,
Second, And Third Vehicle
1018
```

```
Receive, By A First Transceiver Included In The First Set Of Resources, The Query Information
From The Remote Computing Server
1020
```

```
Receive, By A Second Transceiver Included In The Second Set Of Resources, The Query
Information From The Remote Computing Server
1022
```

```
Receive, By A Third Transceiver Included In The Third Set Of Resources, The Query Information
From The Remote Computing Server
1024
```

```
Perform, By The First Set Of Resources, The Distributed Query Based On The Received Query
Information, Wherein Performance Results In A First Set Of Potential Results
1026
```

```
Perform, By The Second Set Of Resources, The Distributed Query Based On The Received
Query Information, Wherein Performance Results In A Second Set Of Potential Results
1027
```

```
Perform, By The Third Set Of Resources, The Distributed Query Based On The Received Query
Information, Wherein Performance Results In A Third Set Of Potential Results
1028
```

```
Convert, By The First Set Of Resources, The First Set Of Potential Results To Create A First Set
Of Results, Wherein The Conversion Is Based On A First Set Of Response Constraints And First
Current Local Data Transmission Conditions
1029
```

Continued on next figure, see Fig. 4C

FIG. 4B

SYSTEMS AND METHODS FOR USING ON-BOARD RESOURCES OF INDIVIDUAL VEHICLES IN A FLEET OF VEHICLES AS A DISTRIBUTED DATA CENTER

FIELD

The systems and methods disclosed herein are related to using on-board resources of individual vehicles in a fleet of vehicles as a distributed data center. In particular, queries and other functions may be distributed across the fleet. Results from individual vehicles may be aggregated and presented via a user interface to a user of the distributed data center.

BACKGROUND

Systems configured to record, store, and transmit video, audio, and sensor data associated with a vehicle, e.g. responsive to an accident involving the vehicle, are known. Typically, such systems detect an accident based on data from a single sensor such as an accelerometer. Some systems store information locally for subsequent analysis. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to use data-processing resources carried by a fleet of vehicles as a distributed data center. The fleet of vehicles may include one or more of a first vehicle, a second vehicle, a third vehicle, and/or a fourth vehicle, and so forth. Individual vehicles may include a set of resources for data processing and/or electronic storage, including but not limited to persistent storage. Individual vehicles may include a set of sensors configured to generate output signals conveying information related to the operation of the individual vehicles. As used herein, transmission and/or distribution of information may be considered a data processing function. As used herein, the terms data and information may be used interchangeably. The system may include sets of resources, sets of sensors, a remote computing server, and/or other components.

One or more components of the system may include one or more processors and/or other mechanisms/components for processing information. For example, a set of resources included in and/or carried by an individual vehicle may include one or more processors. For example, the remote computing server may include one or more processors. In some implementations, other vehicle-specific components, such as, by way of non-limiting example, a vehicle event recorder, may include one or more processors. In some implementations, some or all of the processors may be configured via machine-readable instructions to perform various functions. As used herein, the term "processor" is used interchangeably with the term "physical processor."

A set of resources included in and/or carried by an individual vehicle may include one or more processors, electronic storage, a transceiver, and/or other components. The first vehicle may carry a first set of resources. The second vehicle may carry a second set of resources, and so forth. The first set of resources may include a first transceiver. The second set of resources may include a second transceiver, and so forth. Transceivers may be configured to transfer and/or receive information to and/or from other elements of the system, including but not limited to other vehicles (or components carried by other vehicles), the remote computing server, and/or other components. In some implementations, transceivers may be configured to transfer and/or receive information wirelessly, and/or otherwise provide information-distribution resources. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., 3G, 4G, LTE, Wi-Fi, etc.), a current transmission cost (e.g., in $/MB), and/or other conditions.

A set of sensors may be configured to generate output signals conveying information. In some implementations, the generated information may be related to the operation of one or more vehicles. An individual set of sensors may be carried by an individual vehicle. The generated information may include timing information, operator information, and/or other information. In some implementations, generated information may be associated with timing information (e.g., from a timer), operator information, and/or other information. In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, operator information, and/or other information, e.g. in electronic storage.

A sensor may be configured to generate output signals conveying information related to the operation and/or one or more operating conditions of the vehicle. Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors. An individual sensor may be vehicle-specific.

Individual sensors may be configured to generate output signals conveying information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

As mentioned, individual sensors may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

The system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet.

The remote computing server may include one or more processors. The remote computing server may be remote, separate, and/or discrete from the fleet of vehicles. The one or more processors may be configured via machine-readable instructions to perform various functions. The remote computing server may be configured to facilitate presentation of a user interface to a user of the remote computing server. The user interface may be configured to facilitate interaction between one or more users and the remote computing server. For example, the user interface may be configured to receive user input from a user. In some implementations, the received input may represent a query, e.g. a distributed query. The query may be related to information stored on electronic storage, e.g. in multiple sets of resources of multiple vehicles. Alternatively, and/or simultaneously, the query may be related to one or more vehicle operators. The remote computing server may be further configured to transmit information based on the query and/or otherwise related to the query to some vehicles in the fleet or to all vehicles of the fleet. Results and/or other responses from individual vehicles may be received, aggregated, and/or presented by the remote computing server.

In some implementations, a set of resources included in and/or carried by an individual vehicle may include an event recorder (also referred to as vehicle event recorder). An event recorder may be configured to generate, detect, identify, capture, and/or record information related to operating conditions of a vehicle. Information related to a vehicle may include, by way of non-limiting example, information related to and/or based on vehicle events. An event recorder may be configured to off-load and/or otherwise transmit information. In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events in real-time or near real-time during operation of a vehicle.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers. Some types of vehicle events may be based on the actions or motion of the vehicle itself. Other types of vehicle events may be based on the actions taken or performed by a vehicle operator. Some types of vehicle events may be based on a combination of both the actions or motion of the vehicle itself and the actions taken or performed by a vehicle operator.

The one or more processors of the remote computing server and/or individual sets of resources may be configured to execute one or more computer program components. The computer program components may include one or more of a presentation component, an interface component, a distribution component, a query component, a result component, an aggregate component, a correction component, a re-transmit component, a backup component, a virtualization component, a parameter determination component, a detection component, a storage component, a derivation component, a virtual sensor component, a memory management component, a scoring component, a conversion component, and/or other components.

The presentation component may be configured to facilitate presentation of user interfaces to users. In some implementations, the presentation component may facilitate presentation of a user interface to a user of the remote computing server. In some implementations, the presentation component may facilitate presentation of a user interface to one or more vehicle operators.

The interface component may be configured to facilitate interaction with users. For example, the interface component may facilitate interaction through user interfaces. For example, the interface component may receive user input through a user interface. In some implementations, the interface component may receive user input from the user of a remote computing server. In some implementations, the received user input may represent a query, e.g., a distributed query. For example, a query may be related to operation of a fleet of vehicles, one or more vehicle operators, one or more vehicles, information stored by one or more vehicles, information stored by one or more sets of resources, and/or other information. In some implementations, the query may be related to information stored by multiple vehicles, multiple sets of resources, regarding multiple vehicle operators, and/or otherwise distributed information that is stored in multiple physical locations. For example, an entire fleet of vehicles may be queried for particular information. For example, an entire fleet of vehicles may be queried for information matching one or more criteria and/or filters. In some implementations, a query may be associated with one or more response constraints.

The distribution component may be configured to transmit information from the remote computing server to all or part of a fleet of vehicles. In some implementations, the distribution component may be configured to transmit information from the remote computing server to all or part of the transceivers that are included in and/or carried by a fleet of vehicles. In some implementations, transmission may be wireless. In some implementations, transmission may be point-to-point. In some implementations, transmission may be broadcast. In some implementations, transmission may be bi-directional. For example, the distribution component may be configured to transmit query information from the remote computing server to some or all of the vehicles in a fleet. Query information may be based on a distributed query received from a user interface. For example, individual transceivers may be configured to receive the query information transmitted by the distribution component.

The query component may be configured to perform queries. For example, for a particular vehicle, the query component may perform a query on locally stored information. In some implementations, a distributed query may be performed on information that is physically stored in multiple locations. For example, the information may be stored in two, three, or more vehicles. Subsequent to performance of a distributed query, one or more sets of (potential) results may be produced, e.g. one set of results per vehicle. In some implementations, subsequent data processing may convert, summarize, adjust, and/or otherwise process potential results to create the results that will be transmitted by a transceiver. Individual transceivers may be configured to transmit results from individual vehicles to the remote computing server. In some implementations, performance by the query component may be based on one or more response constraints, one or more data transmission conditions, and/or other conditions. For example, performance by the query component may be based on quality-of-service considerations and/or guidelines.

The conversion component may be configured to convert and/or summarize one or more potential results into one or more results. For example, the conversion component may be configured to convert a set of potential results to create a set of results that will be transmitted by a transceiver. Operation by the conversion component may be based on one or more response constraints, one or more current local data transmission conditions, and/or other conditions.

The result component may be configured to receive information from one or more transceivers. For example, the result component may receive sets of results produced by query components of different vehicles. For example, the received information may include a first set of results received from the transceiver of a first vehicle, a second set of results received from the transceiver of a second vehicle, a third set of results received from the transceiver of a third vehicle, and so forth. Individual sets of results may have been produced by individual query components distributed across different vehicles in the fleet. For example, different sets of resources may include individual instances of a query component.

In some implementations, the result component may be configured to receive information that has been organized into data packets. For example, the data packets may be numbered and/or otherwise annotated. In some implementations, data packets may include error correction information that may be used to determine, upon receipt, if any of the data in a set of packets is missing and/or corrupted.

The aggregate component may be configured to aggregate information received from different transceivers. The aggregated information may be referred to as aggregated results. For example, the aggregate component may be configured to aggregate a first set of results from a first transceiver, a second set of results from a second transceiver, a third set of results from a third transceiver, and so forth. In some implementations, a particular query performed for a particular vehicle may produce a zero result, or an empty result. These types of results may be aggregated with the sets of results from other vehicles in a fleet. The presentation component may be configured to facilitate presentation of the aggregated results to a user of the remote computing server.

The correction component may be configured to determine whether any of the data in a set of data packets is missing and/or corrupted. For example, a set of data packets may include error correction information (including but not limited to error-checking codes). In some implementations, a set of received data packets may include annotations, including but not limited to numbering, such that the correction component can determine whether any data packets are missing. For example, the correction component may determine a particular data packet from a particular transceiver is missing. For example, the correction component may determine a different data packet from a different transceiver has been corrupted.

The re-transmit component may be configured to transmit requests for particular information, such as a particular data packet, to one or more transceivers. Requests from the re-transmit component may be based on determinations by the correction component. For example, the re-transmit component may transmit a first request to a particular transceiver for re-transmission of a particular data packet. For example, the re-transmit component may transmit a second request to a different transceiver for re-transmission of a different data packet. The first and second request may be based on determinations by the correction component.

The backup component may be configured to facilitate backup of particular information in a separate location such that the particular information is physically stored in more than one location. For example, the backup component may select some or all of the information stored in the set of resources for a particular vehicle. For example, the backup component may select one or more locations suitable for storage that are separate and remote from the particular vehicle. The selected information may be transmitted to the selected locations for storage. For example, subsequent to operations performed by the backup component, particular information may be stored at different locations. Redundant storage as accomplished through the operations by the backup component may improve the resilience of the fleet of vehicles to localized outages, data corruption, loss, and/or other types of accidents.

The virtualization component may be configured to effectuate management of distributed sets of resources. In some implementations, an individual distributed set of resources may include resources of the same or similar type. For example, a first distributed set of resources may include resources for electronic storage of information, a second distributed set of resources may include resources that provide information-processing capabilities, a third distributed set of resources may include resources that provide information-distribution capabilities, and so forth. For example, the resources for electronic storage of information may include a first data store (included in the first set of resources for the first vehicle), a second data store (included in the second set of resources for the second vehicle), a third data store (included in the third set of resources for the third vehicle), and so forth. For example, the virtualization component may be configured to manage a distributed data store that includes data stored in the first data store, the second data store, the third data store, and so forth. In some implementations, the virtualization component may be configured to effectuate management of different layers of virtualization of resources. For example, the lowest layer may include the physical resources, the next layer may include the distributed sets of resources, and the next layer may include distributed APIs, applications, and/or services available to users of the remote computing server. The API, application, and/or service layer may include support for different types and/or formats of queries, and/or for different operating systems, e.g. through virtual machines. In some implementations, the virtualization component may be configured to support different types of virtualization, including but not limited to server virtualization, desktop virtualization, application virtualization, network virtualization, storage virtualization, and/or other types of virtualization.

The parameter determination component may be configured to determine current operating conditions and/or vehicle parameters. The parameter determination component may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The detection component may be configured to detect vehicle events. In some implementations, vehicle events may be related to current operating conditions of a vehicle. For example, a vehicle event may be based on comparing one or more vehicle parameters with one or more thresholds.

The storage component may be configured to store information in electronic storage. For example, the information may be stored in the electronic storage of a particular vehicle. In some implementations, the stored information may be related to detected vehicle events, determined vehicle parameters, and/or other information. In some implementations, the storage component may be configured to store vehicle event records of detected vehicle events in electronic storage.

The derivation component may be configured to determine and/or derive information from other information. For example, the derivation component may be configured to derive a set of derivative operating conditions from a set of operating conditions that has been determined by the parameter determination component. For example, a derivative operating condition may be a number of occurrences of a particular vehicle event per a time unit. For example, a first derivative operating condition may be a number of instances of hard braking per hour of drive-time. The definition of "hard braking" may be related to a deceleration meeting a deceleration threshold for a period of time exceeding a timing threshold. In some implementations, the particular definition used to derive a derivative operating condition may be modified as needed, e.g. by a user of the remote computing server. As another example, a derivative operating condition may be a number of occurrences of a particular vehicle event per a unit of distance traveled by a vehicle. For example, a second derivative operating condition may be a number of instances of swerving per 100 miles of distance traveled by a vehicle. In some implementations, the particular definition used to derive a derivative operating condition such as swerving may be modified as needed, e.g. by a user of the remote computing server. Derivative operating conditions may include logical and/or arithmetic combinations of one or more operating conditions. In some implementations, derivative operating conditions may include combinations of operating conditions and other derivative operating conditions.

The virtual sensor component may be configured to define, create, and/or otherwise effectuate management of virtual sensors. A virtual sensor may be configured to generate an output signal that conveys information related to a derivative operating condition, including but not limited to derivative operating conditions from the derivation component. For example, a first virtual sensor may be defined as a sensor that detects and/or measures the first derivative operating condition, a second virtual sensor may be defined as a sensor that detects and/or measures the second derivative operating condition, a third virtual sensor may be defined as a sensor that detects and/or measures the third derivative operating condition, a fourth virtual sensor may be defined as a sensor that detects and/or measures the fourth derivative operating condition, and so forth. In some implementations, individual derivative operating conditions may be assigned to individual virtual sensors and/or vice versa. In some implementations, the storage component may be configured to store output signals generated by virtual sensors (and/or the information conveyed thereby) in electronic storage.

The memory management component may be configured to determine and/or modify rates of store for sensors and/or virtual sensors. For example, a first sensor may generate output signals continuously conveying a first operating parameter. The memory management component may be configured to determine at what rate the first operating parameter is stored. For example, in case the first operating parameter is speed, the rate of storage may be once per second, once per 10 seconds, once per minute, and/or another rate of storage. In some implementations, the rate of storage may be adjusted based on the occurrence of one or more vehicle events. For example, some period of time before and/or after a particular event (such as a collision), the rate of storage may be increased to a higher rate (e.g., once per second), whereas outside of that period of time before and/or after the particular event, the rate of storage may be decreased to a lower rate (e.g., once a minute). In some implementations, the memory management component may be configured to allocate previously used storage for reuse. For example, a section of storage that was previously used to store a particular operating parameter at a first rate of storage may be reused partially such that, subsequent to this reuse, the section of storage appears to be used to store the particular operating parameter at a second rate of storage that is lower than the first rate of storage. For example, the section may be interleaved with a first set of a first operating parameter (stored at a first rate and generated during a first period) and a second set of the same operating parameter generated at a second period subsequent to the first period. The second set may be stored at the same storage rate or at a different storage rate. In some implementations, the section may be interleaved with a set of different operating parameters, which may be stored at the same storage rate, or using different storage rates.

The scoring component may be configured to determine operator scores that are specific to vehicle operators. For example, an operator score may reflect a quality assessment of driving by the vehicle operator. For example, an operator score may be based on one or more detected vehicle events. In some implementations, an operator score may include one or more scores for safety, timeliness, fuel-efficiency, and/or other dimensions of a quality assessment. In some implementations, an operator score may be based on output generated by one or more virtual sensors. In some implementations, operator scores may be presented to vehicle operators and/or to users of the remote computing server. In some implementations, operator scores may be stored for future usage.

In some implementations, one or more components of the system may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, vehicle events, operating conditions, parameters, thresholds, functions, notifications, constraints, transmission conditions, potential results, results, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A-4B-4C illustrate a method to use data-processing resources carried by a fleet of vehicles as a distributed data center, in accordance with one or more embodiments.

DETAILED DESCRIPTION

Figure 1:
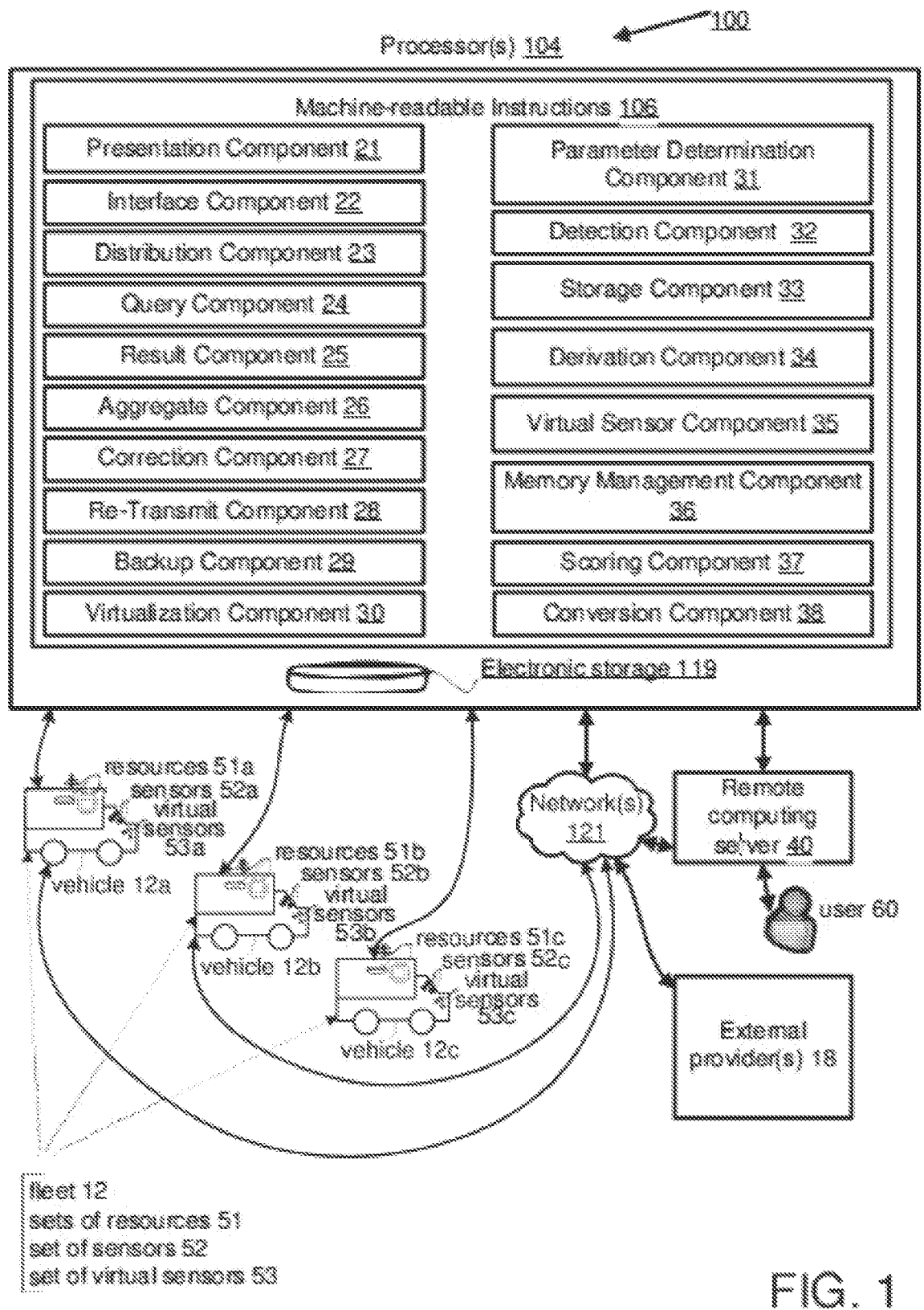
FIGS. 1-2 illustrate systems configured to use data-processing resources carried by a fleet of vehicles as a distributed data center, in accordance with one or more embodiments.

FIG. 1 illustrates a system 100 configured to use data-processing resources carried by a fleet 12 of vehicles as a distributed data center. Fleet 12 may include one or more of a first vehicle, a second vehicle, a third vehicle, and/or a fourth vehicle, and so forth. As used here, the term fleet may refer to a set of at least 5 vehicles, at least 10 vehicles, at least 100 vehicles, at least 1000 vehicles, and/or another number of vehicles. Individual vehicles may include a set of resources for data processing and/or electronic storage, including but not limited to persistent storage. Individual vehicles may include a set of sensors configured to generate output signals conveying information related to the operation of the individual vehicles. System 100 may include sets of resources 51, sets of sensors 52, sets of virtual sensors 53, a remote computing server 40, electronic storage 119, and/or other components. In some implementations, system 100 may be or include a distributed data center.

One or more components of system 100 may include one or more processors 104 and/or other mechanisms/components for processing information. For example, a set of resources 51 included in and/or carried by an individual vehicle may include one or more processors. For example, remote computing server 40 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 119 and/or other mechanisms/components for storing information. For example, a set of resources 51 included in and/or carried by an individual vehicle may include electronic storage. For example, remote computing server 40 may include electronic storage. In some implementations, other vehicle-specific components, such as, by way of non-limiting example, a vehicle event recorder, may include electronic storage.

Figure 2:
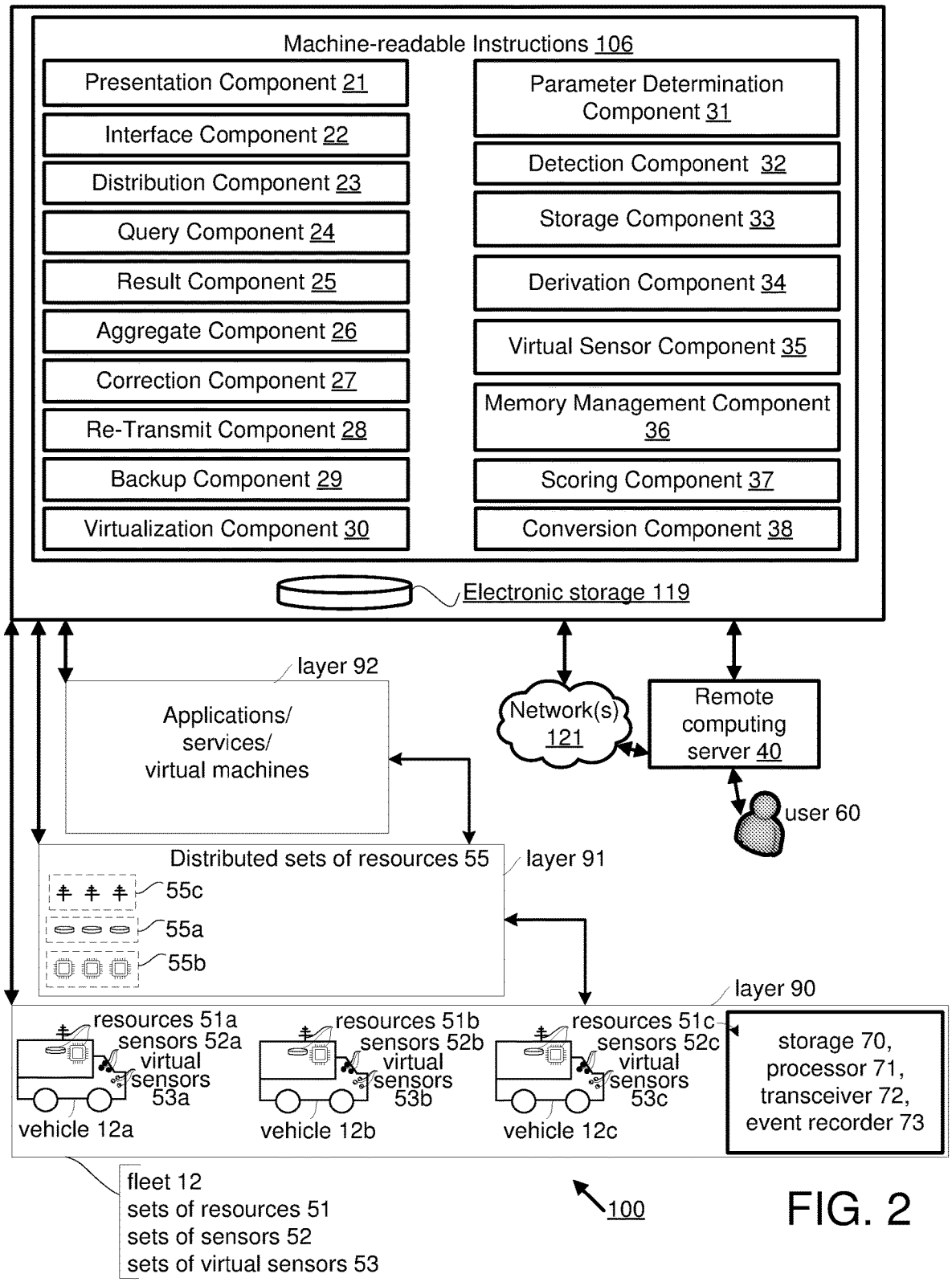

By way of non-limiting example, as shown in FIG. 2, a set of resources 51 included in and/or carried by an individual vehicle (e.g. set of resources 51c carried by vehicle 12c) may include one or more of electronic storage 70, a processor 71, a transceiver 72, an event recorder 73, and/or other components. First vehicle 12a may carry a first set of resources 51a. Second vehicle 12b may carry a second set of resources 51b. Third vehicle 12c may carry a third set of resources 51c, and so forth. First set of resources 51a may include a first transceiver. Second set of resources 51b may include a second transceiver, and so forth. For example, first set of resources 51a may include first electronic storage, second set of resources 51b may include second electronic storage, third set of resources 51c may include third electronic storage (here, storage 70), and so forth. For example, first set of resources 51a may include one or more processors, second set of resources 51b may include one or more processors, third set of resources 51c may include one or more processors (here, processor 71), and so forth.

Transceivers may be configured to transfer and/or receive information to and/or from other elements of system 100, including but not limited to other vehicles (or components carried by other vehicles in fleet 12), remote computing server 40, and/or other components. In some implementations, transceivers may be configured to transfer and/or receive information wirelessly, and/or otherwise provide information-distribution resources. In some implementations, transceivers may be configured to obtain, receive, measure, and/or otherwise determine one or more conditions related to data transmissions. For example, one or more current local data transmission conditions may include a current bandwidth (e.g., in MB/s), a current transmission protocol (e.g., 3G, 4G, LTE, Wi-Fi, etc.), a current transmission cost (e.g., in $/MB), and/or other conditions.

Referring to FIG. 1, a set of sensors 52 may be configured to generate output signals conveying information. In some implementations, the generated information may be related to the operation of one or more vehicles in fleet 12. An individual set of sensors 52 may be carried by an individual vehicle. First vehicle 12a may carry a first set of sensors 52a. Second vehicle 12b may carry a second set of sensors 52b. Third vehicle 12c may carry a third set of sensors 52c, and so forth. The generated information may include timing information, operator information, and/or other information. In some implementations, generated information may be associated with timing information (e.g., from a timer), operator information, and/or other information. In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources 51 may be configured to store generated information, timing information, operator information, and/or other information, e.g. in electronic storage.

A sensor may be configured to generate output signals conveying information related to the operation and/or one or more operating conditions of a vehicle. Information related to the operation of a vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. The sensors of a particular vehicle may be referred to as a set of sensors. An individual sensor is vehicle-specific.

Information related to current operating conditions of a vehicle may include feedback information from one or more of the mechanical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the inside of the vehicle (e.g., the cabin) and/or a 360-degree view of the outside of the vehicle.

Although individual sets of sensors 52a, 52b, and 52c are depicted in FIG. 1 as having three elements, this is not intended to be limiting. For individual vehicles, a set of sensors 142 may include one or more sensors located adjacent to and/or in communication with the various mechanical systems of the vehicle, in one or more positions (e.g., at or near the front of the vehicle, at or near the back of the vehicle, on the side of the vehicle, on or near the windshield of the vehicle, facing outward and/or inward, etc.) to accurately acquire information representing the vehicle environment (e.g. visual information, spatial information, orientation information), and/or in other locations. For example, in some implementations, a set of sensors for a particular vehicle may be configured such that a first sensor is located near or in communication with a rotating tire of the vehicle, and a second sensor located on top of the vehicle is in communication with a geolocation satellite.

Individual sensors may be configured to generate output signals conveying information. The information may include visual information, motion-related information, position-related information, biometric information, and/or other information. In some implementations, one or more components of system 100 may determine one or more parameters that are measured, derived, estimated, approximated, and/or otherwise determined based on one or more output signals generated by one or more sensors.

Output signals generated by individual sensors (and/or information based thereon) may be stored and/or transferred in electronic files. In some implementations, output signals generated by individual sensors (and/or information based thereon) may be streamed to one or more other components of system 100.

Individual sensors may include image sensors, cameras, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 121. The one or more networks 121 may, by way of non-limiting example, include the internet.

Remote computing server 40 may include one or more processors 104. Remote computing server 40 may be remote, separate, and/or discrete from the fleet of vehicles 12. One or more processors 104 may be configured via machine-readable instructions 106 to perform various functions. Remote computing server 40 may be configured to facilitate presentation of a user interface to a user 60 of remote computing server 40. The user interface may be configured to facilitate interaction between one or more users and remote computing server 40. For example, the user interface may be configured to receive user input from user 60. In some implementations, the received input may represent a query, e.g. a distributed query. The query may be related to information stored on electronic storage, e.g. in multiple sets of resources of multiple vehicles. Alternatively, and/or simultaneously, the query may be related to one or more vehicle operators. Remote computing server 40 may be further configured to transmit information based on the query and/or otherwise related to the query to some vehicles in the fleet or to all vehicles of the fleet. Results and/or other responses from individual vehicles may be received, aggregated, and/or presented by remote computing server 40.

Figure 3:
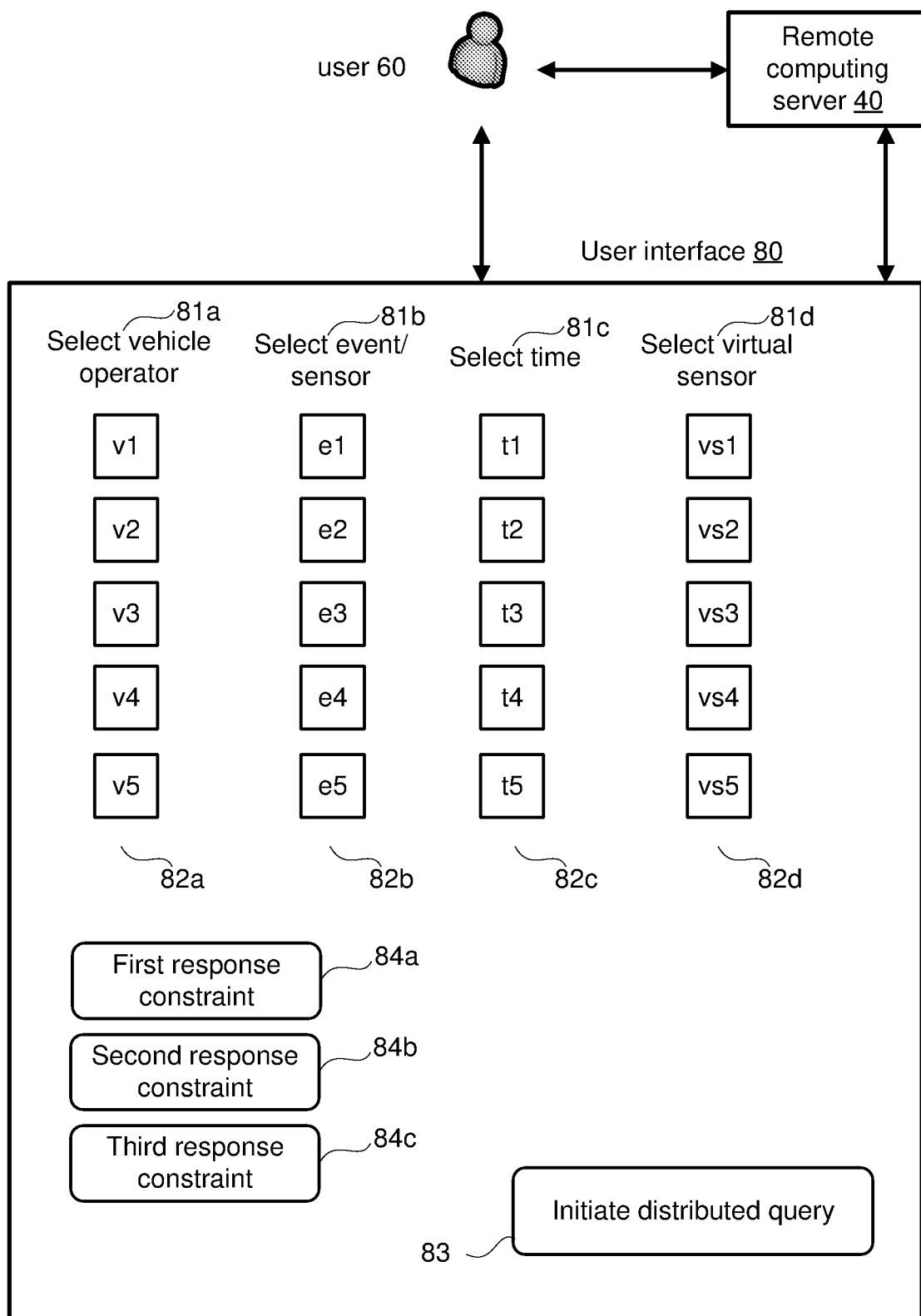
FIG. 3 illustrates an exemplary user interface to be used with a system configured to use data-processing resources carried by a fleet of vehicles as a distributed data center.

By way of non-limiting example, FIG. 3 illustrates a user interface 80 used by user 60 through remote computing server 40. User interface 80 may include user interface elements 81a-81b-81c-81d-82a-82b-82c-82d-83-84a-84b-84c, and/or other elements. For example, selection elements 81a, 81b, 81c, and 81d may depict a way for user 60 to enter a distributed query. For example, selection element 81a includes vehicle operator elements 82a, which allow user 60 to enter and/or select up to five vehicle operators, herein labeled as "v1," "v2," "v3," "v4," and "v5". For example, selection element 81b includes event or sensor elements 82b, which allow user 60 to enter and/or select up to five vehicle events or sensors, herein labeled as "e1," "e2," "e3," "e4," and "e5". For example, selection element 81c includes timing elements 82c, which allow user 60 to enter and/or select up to five timing periods, herein labeled as "t1," "t2," "t3," "t4," and "t5". For example, selection element 81d includes virtual sensor elements 82d, which allow user 60 to enter and/or select up to five virtual sensors, herein labeled as "vs1," "vs2," "vs3," "vs4," and "vs5". For example, first response constraint 84a may allow user 60 to enter and/or select a response constraint related to a time frame. For example, second response constraint 84b may allow user 60 to enter and/or select a response constraint related to an amount of data, which may be referred to as a data budget. For example, first response constraint 84c may allow user 60 to enter and/or select a response constraint related to an amount of transmission costs. Action element 83 initiates and/or launches a distributed query in accordance with the selections and/or entries made in user interface 80.

For example, user interface 80 is configured to let user 60 initiate a first distributed query of any activity pertaining to a particular vehicle operator. In some cases, a particular vehicle operator may use different vehicles in a span of weeks, months, or years. Relevant information pertaining to this vehicle operator may be stored in different vehicles. The first distributed query, subsequent to initiation, may effectuate a search of relevant information among multiple vehicles, e.g. among an entire fleet.

For example, a second distributed query may seek a particular type of activity (e.g., a particular vehicle event) on a particular vehicle, regardless of which vehicle operators were operating the vehicle at the moment the particular activity occurred.

For example, a third distributed query may seek relevant information regarding one or more particular types of vehicle events across the entire fleet. For example, such a distributed query may be limited to a particular period of time, a particular type of weather, a particular geographical location and/or area, and/or any limitation based on a combination of conditions.

Logical and/or sequential combinations of different types of distributed queries may be supported. For example, a fourth distributed query may seek relevant information regarding a particular dangerous driving maneuver, at a particular time of day, within a particular geographical area, for a particular class of vehicle operators, in particular driving and/or weather conditions. Any of the distributed queries may be associated with one or more response constraints. As used herein, a response constraint is a vehicle-specific constraint that is used to control operations of an individual set of resources, query component 24, conversion component 38, a transceiver, and/or another vehicle-specific component. A response constraint may limit the amount of data used for a response to a distributed query, the amount of cost incurred in providing a response to a distributed query, an amount of time user to respond to a distributed query, and/or other characteristics related to responding to a distributed query, as well as logical and/or sequential combinations of one or more of these. In some implementations, vehicle-specific components involved in responding to a distributed query may use a default set of response constraints. For example, a particular default constraint may limit responses to $5 in data transmission costs. For example, a particular default constraint may require responses to be completed in 24 hours from the moment the distributed query was made. In some implementations, a particular distributed query my override one or more default response constraints.

Referring to FIG. 2, in some implementations, a set of resources included in and/or carried by an individual vehicle may include an event recorder (also referred to as vehicle event recorder). For example, set of resources 51c carried by the vehicles may include event recorder 73, as shown in FIG. 2. An event recorder may be configured to generate, detect, identify, capture, and/or record information related to operating conditions of a vehicle. Information related to a vehicle may include, by way of non-limiting example, information related to and/or based on vehicle events. An event recorder may be configured to off-load and/or otherwise transmit information (e.g. through use of a transceiver such as transceiver 72). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events in real-time or near real-time during operation of a vehicle.

Referring to FIG. 1, one or more processors 104 of remote computing server 40 and/or of individual sets of resources 51 may be configured to execute one or more computer program components. The computer program components may include one or more of a presentation component 21, an interface component 22, a distribution component 23, a query component 24, a result component 25, an aggregate component 26, a correction component 27, a re-transmit component 28, a backup component 29, a virtualization component 30, a parameter determination component 31, a detection component 32, a storage component 33, a derivation component 34, a virtual sensor component 35, a memory management component 36, a scoring component 37, a conversion component 38, and/or other components.

Presentation component 21 may be configured to facilitate presentation of user interfaces to users. In some implementations, presentation component 21 may facilitate presentation of a user interface to user 60 of remote computing server 40. In some implementations, presentation component 21 may facilitate presentation of a user interface to one or more vehicle operators. This enables information to be communicated between a vehicle operator and/or other components of system 100. As an example, a dangerous driving maneuver and/or vehicle event may be displayed to the driver of the vehicle via such a user interface, e.g. as a notification.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as a user interface. Other exemplary input devices and techniques adapted for use by users and/or vehicle operators include, but are not limited to, an RS-232 port, RF link, an IR link, modem (telephone, cable, and/or other modems), a cellular network, a Wi-Fi network, a local area network, and/or other devices and/or systems. In short, any technique for communicating information is contemplated by the present disclosure as a user interface.

Interface component 22 may be configured to facilitate interaction with users. For example, a user may be a fleet manager, or someone investigating fleet operations. Interface component 22 may facilitate interaction through user interfaces. For example, interface component 22 may receive user input through a user interface. In some implementations, interface component 22 may receive user input from user 60 of remote computing server 40. In some implementations, the received user input may represent a distributed query. For example, a distributed query may be related to one or more vehicle operators, one or more vehicles, information stored by one or more vehicles, information stored by one or more sets of resources, and/or other information. In some implementations, the distributed query may be related to information stored by multiple vehicles, multiple sets of resources, regarding multiple vehicle operators, and/or otherwise distributed information that is stored in multiple physical locations. For example, an entire fleet of vehicles 12 (or any subset thereof) may be queried for particular information. In some implementations, a distributed query may be associated with one or more response constraints. For example, distribution component 23 may be configured to transmit the one or more response constraints to all or part of fleet of vehicles 12.

In some implementations, distributed queries may be performed on historic data, and produce results pertaining to past performance of the fleet of vehicles. In some implementations, distributed queries may be performed on current data, and produce results pertaining to current performance of the fleet of vehicles. A distributed query for current data may operate as a subscription on future information that satisfies the particular query. In some implementations, distributed queries may be performed on both historic and current/future data, and produce different sets of results for each. For example, different sets of response constraints may be used for historic and current/future data.

In some implementations, interface component 22 may be configured to effectuate a review presentation to a user or reviewer, e.g. user 60. A review presentation may be based on information related to one or more detected vehicle events. In some implementations, a review presentation may provide a prompt to a user or reviewer to provide manual review input, e.g., regarding one or more detected vehicle events. For example, a reviewer may be prompted via a question, an inquiry, and/or via other types of prompts. For example, a reviewer may be asked whether a driver was wearing a seatbelt at a particular point in time. A review presentation may be implemented as a user interface to facilitate interaction for a reviewer. For example, such a user interface may receive review input from a reviewer, including but not limited to manual review input. In some implementations, review input may be responsive to a prompt. In some implementations, a vehicle operator may receive information based on review input. Such information may be referred to as feedback. For example, a user interface for a vehicle operator (this may be referred to as a driver interface) may present a message to a vehicle operator to "remember to wear your seatbelt," responsive to particular review input received from a reviewer (through a different user interface). In some implementations, a driver interface may be configured to detect a vehicle operator's response to feedback. In some implementations, the response by a vehicle operator may be specific to the feedback received through the driver interface.

Distribution component 23 may be configured to transmit information from remote computing server 40 to all or part of fleet of vehicles 12. In some implementations, distribution component 23 may be configured to transmit information from remote computing server 40 to all or part of the transceivers that are included in and/or carried by fleet of vehicles 12. In some implementations, transmission may be wireless. In some implementations, transmission may be point-to-point. In some implementations, transmission may be broadcast. In some implementations, transmission may be bi-directional. For example, distribution component 23 may be configured to transmit wireless query information from remote computing server 40 to some or all of the vehicles in fleet 12. Query information may be based on a distributed query received from a user interface. In some implementations, distribution component 23 may be configured to transmit information related to one or more response constraints from remote computing server 40 to some or all of the vehicles in fleet 12. For example, one or more response constraints may be associated with either a particular distributed query, or with future queries (e.g., until and unless new response constraints are transmitted). For example, individual transceivers may be configured to receive the query information transmitted by distribution component 23. Individual transceivers may be configured to obtain, receive, and/or determine response constraints. For example, one or more response constraints may be associated with a distributed query and/or included in transmitted query information.

Query component 24 may be configured to perform queries. For example, for a particular vehicle, query component 24 may perform a query on locally stored information. In some implementations, a distributed query may be performed on information that is physically stored in multiple locations. For example, the information may be stored in two, three, or more vehicles. The distributed query may be based on query information received by one or more transceivers. Subsequent to performance of a distributed query, one or more sets of potential results may be produced. Potential results may be converted and/or otherwise processed by conversion component 38 to create the results that will be transmitted. For example, individual transceivers may be configured to transmit results (e.g., converted potential results) from one or more vehicles to remote computing server 40. In some implementations, query component 24 may be configured to perform a distributed query in a manner that is based at least in part on one or more response constraints. For example, for urgent and time-limited queries having a limited data budget, high-resolution images and/or high-resolution video may be a priori excluded from even the potential results.

Conversion component 38 may be configured to convert and/or summarize one or more potential results into one or more results. For example, conversion component 38 may be configured to convert a set of potential results to create a set of results that will be transmitted by a transceiver. Operation by conversion component 38 may be based on one or more response constraints, one or more current local data transmission conditions, and/or other conditions. For example, for urgent and time-limited queries having a limited data budget, conversion component 38 may be configured to convert high-resolution images and/or high-resolution video in a set of potential results to lower-resolution images and/or lower-resolution video to create a set of results for transmission.

In some implementations, conversion component 38 may be configured to convert a potential result having a particular format into a result having a different format that uses a smaller amount of data than the original potential result. For example, images captured by image sensors tend to require a larger amount of data than the results after one or more of computer vision, computer detection, feature extraction, and/or other image processing techniques have been applied to the captured images. In some implementations, conversion component 38 may be configured to compress a potential result such that the compressed result uses a smaller amount of data than the original potential result.

In some implementations, operations by vehicle-specific components in response to a distributed query may be adjusted and/or controlled dynamically in response to changing data transmission conditions. For example, a particular set of resources for a particular vehicle may receive a distributed query having a cost limit of $5, which at the current (cellular data) transmission protocol in the local area of the particular vehicle, given the known data transmission costs, limits the response to X minutes of transmission (or a data budget of Y MB of data). Based on these constraints, conversion component 38 may autonomously decide to forego any video, and instead include in the set of results a particular number of snapshots of a particular image sensor, at pertinent moments in time. However, prior to X minutes passing (or prior to Y MB of data being transmitted in response to the distributed query), the current transmission protocol may change in a manner that either reduces the cost of data transmission, or improves the available bandwidth such that effectively the data budget is increased. Conversion component 38 may be configured to take advantage of such a transmission protocol change and subsequently change information in the set of results and/or add information to the set of results that was previously excluded, such as relevant video clips. For example, the original set of response constraints may continue to be in effect, such as the cost limit of $5. However, due to the real-time changes, the conversion from the set of potential results to the set of results to be transmitted may dynamically change as well. At each vehicle the operations that provide a response to a distributed query may be performed independently from any other vehicle. Even vehicles having the same or similar sensors, resources, and response constraints may respond differently due to localized differences in current local data transmission conditions. In some implementations, individual vehicles and/or sets of resources included in individual vehicles may independently perform the same distributed query based on vehicle-specific quality-of-service considerations and/or guidelines.

Result component 25 may be configured to receive information from one or more transceivers (and/or from one or more vehicles). For example, result component 25 may receive sets of results produced by query components of different vehicles and/or converted by conversion components of different vehicles. For example, the received information may include a first set of results received from the transceiver of first vehicle 12a, a second set of results received from the transceiver of second vehicle 12b, a third set of results received from the transceiver of third vehicle 12c, and so forth. Individual sets of results may have been produced by individual query components and/or conversion components (e.g., instances of query component 24 and/or conversion component 38) distributed across different vehicles in fleet 12. For example, different sets of resources may include individual instances of a query component. For example, different sets of resources may include individual instances of a conversion component.

In some implementations, result component 25 may be configured to receive information that has been organized into data packets. For example, the data packets may be numbered and/or otherwise annotated. In some implementations, data packets may include error correction information that may be used to determine, upon receipt, if any of the data in a set of packets is missing and/or corrupted.

Aggregate component 26 may be configured to aggregate information received from different transceivers. The aggregated information may be referred to as aggregated results. For example, aggregate component 26 may be configured to aggregate a first set of results from a first transceiver (included in first set of resources 51a), a second set of results from a second transceiver (included in second set of resources 51b), a third set of results from a third transceiver (included in third set of resources 51c), and so forth. In some implementations, a particular query performed for a particular vehicle may produce a zero result, or an empty result. These types of results may be aggregated with the sets of results from other vehicles in fleet 12. Presentation component 21 may be configured to facilitate presentation of the aggregated results to user 60 of remote computing server 40.

Correction component 27 may be configured to determine whether any of the data in a set of data packets is missing and/or corrupted. For example, a set of data packets may include error correction information (including but not limited to error-checking codes). In some implementations, a set of received data packets may include annotations, including but not limited to numbering, such that correction component 27 can determine whether any data packets are missing. For example, correction component 27 may determine a particular data packet from a particular transceiver is missing. For example, correction component 27 may determine a different data packet from a different transceiver has been corrupted.

Re-transmit component 28 may be configured to transmit requests for particular information, such as a particular data packet, to one or more transceivers. Requests from re-transmit component 28 may be based on determinations by correction component 27. For example, re-transmit component 28 may transmit a first request to a particular transceiver for re-transmission of a particular data packet. For example, re-transmit component 28 may transmit a second request to a different transceiver for re-transmission of a different data packet. The first and second request may be based on determinations by correction component 27.

Backup component 29 may be configured to facilitate backup of particular information in a separate location such that the particular information is physically stored in more than one location. For example, backup component 29 may select some or all of the information stored in the set of resources for a particular vehicle. For example, backup component 29 may select one or more locations suitable for storage that are separate and remote from the particular vehicle. The selected information may be transmitted to the selected locations for storage. For example, subsequent to operations performed by backup component 29, particular information may be stored at different locations. Redundant storage as accomplished through the operations by backup component 29 may improve the resilience of fleet of vehicles 12 to localized outages, data corruption, loss, and/or other types of accidents.

Virtualization component 30 may be configured to effectuate management of distributed sets of resources 55. In some implementations, an individual distributed set of resources may include resources of the same or similar type. For example, a first distributed set of resources 55a may include resources for electronic storage of information, a second distributed set of resources 55b may include resources that provide information-processing capabilities, a third distributed set of resources 55c may include resources that provide information-distribution capabilities, and so forth. For example, the resources for electronic storage of information may include a first data store (included in first set of resources 51a for the first vehicle), a second data store (included in the second set of resources 51b for the second vehicle), a third data store (included in the third set of resources 51c for the third vehicle), and so forth. For example, virtualization component 30 may be configured to manage a distributed data store that includes data stored in the first data store, the second data store, the third data store, and so forth. In some implementations, virtualization component 30 may be configured to effectuate management of different layers of virtualization of resources. For example, the lowest layer 90 may include the physical resources, a next layer 91 may include the distributed sets of resources, and another next layer 92 may include distributed APIs, distributed applications, and/or services available to users of remote computing server 40. The API, application, and/or service layer may include support for different types and/or formats of queries, and/or for different operating systems, e.g. through virtual machines. In some implementations, virtualization component 40 may be configured to support different types of virtualization, including but not limited to server virtualization, desktop virtualization, application virtualization, network virtualization, storage virtualization, and/or other types of virtualization.

Parameter determination component 31 may be configured to determine current operating conditions and/or vehicle parameters. Parameter determination component 31 may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, parameter determination component 31 may be configured to determine one or more of the current operating conditions one or more times in an ongoing manner during operation of the vehicle.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters.

The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical features.

In some implementations, parameter determination component 31 may be configured to determine one or more vehicle parameters based on the output signals from at least two different sensors. For example, parameter determination component 31 may determine one or more of the vehicle parameters based on output signals from a sensor related to the ECM system and an external aftermarket added sensor. In some implementations, a determination of one or more of the vehicle parameters based on output signals from at least two different sensors may be more accurate and/or precise than a determination based on the output signals from only one sensor. For example, on an icy surface, output signals from an accelerometer may not convey that a driver of the vehicle is applying the brakes of the vehicle. However, a sensor in communication with the braking system of the vehicle would convey that the driver is applying the brakes. A value of a braking parameter may be determined based on the braking sensor information even though the output signals from the accelerometer may not convey that the driver is applying the brakes.

Parameter determination component 31 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of the vehicle. In some implementations, one or more of the vehicle parameters may be determined at regular time intervals during operation of the vehicle. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, parameter determination component 31 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 100, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through a user interface.

Detection component 32 may be configured to detect vehicle events. In some implementations, vehicle events may be related to current operating conditions of a vehicle. For example, a vehicle event may be based on comparing one or more vehicle parameters with one or more thresholds.

In some implementations, detection component 32 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Detection component 32 may be configured such that force maintained over a period of time at a particular vehicle speed may decrease a threshold force the longer that the force is maintained. Detection component 32 may be configured such that, combined with engine load data, throttle data may be used to determine a risky event, a fuel wasting event, and/or other events.

Storage component 33 may be configured to store information in electronic storage. For example, the information may be stored in the electronic storage of a particular vehicle. In some implementations, the stored information may be related to detected vehicle events, determined vehicle parameters, and/or other information. In some implementations, storage component 33 may be configured to store vehicle event records of detected vehicle events in electronic storage.

Derivation component 34 may be configured to determine and/or derive information from other information. For example, derivation component 34 may be configured to derive a set of derivative operating conditions from a set of operating conditions that has been determined by parameter determination component 31. For example, a derivative operating condition may be a number of occurrences of a particular vehicle event per a time unit. For example, a first derivative operating condition may be a number of instances of hard braking per hour of drive-time. The definition of "hard braking" may be related to a deceleration meeting a deceleration threshold for a period of time exceeding a timing threshold. In some implementations, the particular definition used to derive a derivative operating condition may be modified as needed, e.g. by user 60 of remote computing server 40. As another example, a derivative operating condition may be a number of occurrences of a particular vehicle event per a unit of distance traveled by a vehicle. For example, a second derivative operating condition may be a number of instances of swerving per 100 miles of distance traveled by a vehicle. In some implementations, the particular definition used to derive a derivative operating condition such as swerving may be modified as needed, e.g. by a user of the remote computing server. Derivative operating conditions may include logical and/or arithmetic combinations of one or more operating conditions. In some implementations, derivative operating conditions may include combinations of operating conditions and other derivative operating conditions. For example, a third derivative operating condition may be the number of instances of either swerving or hard braking that is detected per hour of driving over 50 miles per hour (i.e., vehicle events occurring at a lower speed are not included in this combination). For example, a fourth derivative operating condition may be the number of instances of either swerving or hard braking that is detected per 100 miles of driving over 50 miles per hour (i.e., vehicle events occurring at a lower speed are not included in this combination). For example, a fifth derivative operating condition may be the number of instances of either swerving or hard braking that is detected per hour of driving within a particular geographic area (i.e., vehicle events occurring outside this area are not included in this combination).

Virtual sensor component 35 may be configured to define, create, and/or otherwise effectuate management of virtual sensors. A virtual sensor may be configured to generate an output signal that conveys information related to a derivative operating condition, including but not limited to derivative operating conditions from derivation component 34. For example, a first virtual sensor may be defined as a sensor that detects and/or measures the first derivative operating condition, a second virtual sensor may be defined as a sensor that detects and/or measures the second derivative operating condition, a third virtual sensor may be defined as a sensor that detects and/or measures the third derivative operating condition, a fourth virtual sensor may be defined as a sensor that detects and/or measures the fourth derivative operating condition, and so forth. In some implementations, individual derivative operating conditions may be assigned to individual virtual sensors and/or vice versa. In some implementations, storage component 33 may be configured to store output signals generated by virtual sensors (and/or the information conveyed thereby) in electronic storage.

Memory management component 36 may be configured to determine and/or modify rates of store for sensors and/or virtual sensors. For example, a first sensor may generate output signals continuously conveying a first operating parameter. Memory management component 36 may be configured to determine at what rate the first operating parameter is stored. For example, in case the first operating parameter is speed, the rate of storage may be once per second, once per 10 seconds, once per minute, and/or another rate of storage. In some implementations, the rate of storage may be adjusted based on the occurrence of one or more vehicle events. For example, some period of time before and/or after a particular event (such as a collision), the rate of storage may be increased to a higher rate (e.g., once per second), whereas outside of that period of time before and/or after the particular event, the rate of storage may be decreased to a lower rate (e.g., once a minute). In some implementations, memory management component 36 may be configured to allocate previously used storage for reuse. For example, a section of storage that was previously used to store a particular operating parameter at a first rate of storage may be reused partially such that, subsequent to this reuse, the section of storage appears to be used to store the particular operating parameter at a second rate of storage that is lower than the first rate of storage. For example, the section may be interleaved with a first set of a first operating parameter (stored at a first rate and generated during a first period) and a second set of the same operating parameter generated at a second period subsequent to the first period. The second set may be stored at the same storage rate or at a different storage rate. In some implementations, the section may be interleaved with a set of different operating parameters, which may be stored at the same storage rate, or using different storage rates.

Scoring component 37 may be configured to determine operator scores that are specific to vehicle operators. For example, an operator score may reflect a quality assessment of driving by the vehicle operator. For example, an operator score may be based on one or more detected vehicle events. In some implementations, an operator score may include one or more scores for safety, timeliness, fuel-efficiency, and/or other dimensions of a quality assessment. In some implementations, an operator score may be based on output generated by one or more virtual sensors. In some implementations, operator scores may be presented to vehicle operators and/or to users of the remote computing server. In some implementations, operator scores may be stored for future usage.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers 18. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at the vehicle speeds less than about 10 kph. The −0.3 g and/or +0.3 g criteria may be scaled as the vehicle increases in speed. In some implementations, the −0.3 g and/or +0.3 g criteria may be scaled (e.g., reduced) by about 0.0045 g per kph of speed over 10 kph. To prevent too much sensitivity, the lateral force criteria may be limited to about +/−0.12 g, regardless of the speed of the vehicle, for example. In some implementations, the criterion for the given period of time between swerves may be about 3 seconds.

Electronic storage 119 may comprise electronic storage media that electronically stores information. The electronic storage media of electronic storage 119 may comprise one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 119 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may store software algorithms, recorded video event data, information determined by processor 104, information received via a user interface, and/or other information that enables system 100 to function properly. Electronic storage 119 may be (in whole or in part) a separate component within system 100, or electronic storage 119 may be provided (in whole or in part) integrally with one or more other components of system 100.

As described above, processor 104 may be configured to provide information-processing capabilities in system 100. As such, processor 104 may comprise one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may comprise a plurality of processing units. These processing units may be physically located within the same device (e.g., a vehicle event recorder), or processor 104 may represent processing functionality of a plurality of devices operating in coordination.

Processor 110 may be configured to execute components 21-38 by software; hardware; firmware; some combination of software, hardware, and/or firmware; and/or other mechanisms for configuring processing capabilities on processor 110. It should be appreciated that although components 21-38 are illustrated in FIG. 1 as being co-located within a single processing unit, in implementations in which processor 104 comprises multiple processing units, one or more of components 21-38 may be located remotely from the other components. The description of the functionality provided by the different components 21-38 described herein is for illustrative purposes, and is not intended to be limiting, as any of components 21-38 may provide more or less functionality than is described. For example, one or more of components 21-38 may be eliminated, and some or all of its functionality may be provided by other components 21-38. As another example, processor 104 may be configured to execute one or more additional components that may perform some or all of the functionality attributed below to one of components 21-38.

Figure 4C:
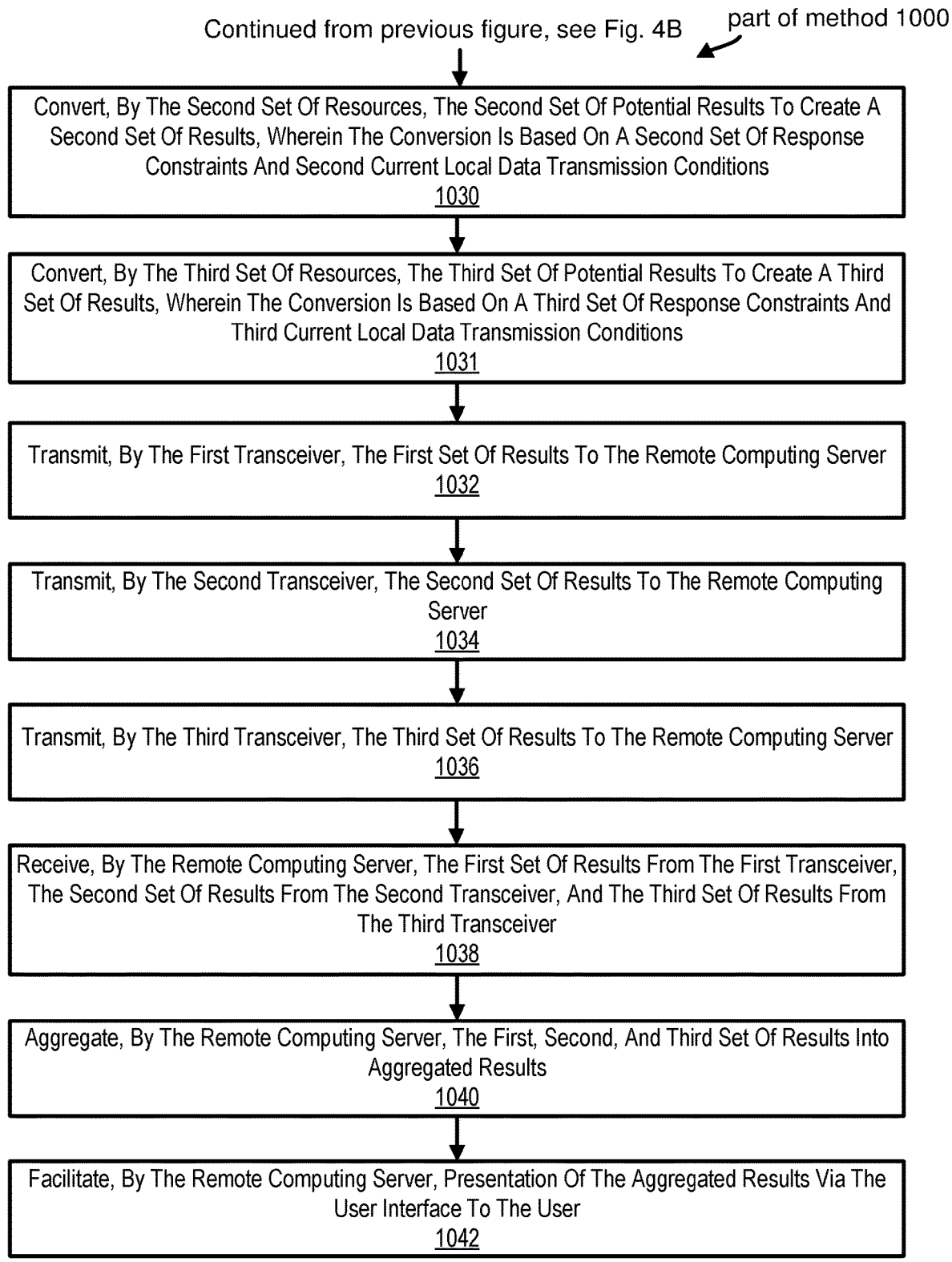

FIGS. 4A-4B-4C illustrate a method 1000 to capture information based on detected vehicle events. The operations of method 1000 presented below are intended to be illustrative. In some implementations, method 1000 may be accomplished with one or more additional operations not described, and/or without one or more of the operations discussed. Additionally, the order in which the operations of method 1000 are illustrated (in FIGS. 4A-4B-4C) and described below is not intended to be limiting. In some implementations, two or more of the operations may occur substantially simultaneously.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on one or more electronic storage mediums. The one or more processing devices may include one or more devices configured through hardware, firmware, and/or software to be specifically designed for execution of one or more of the operations of method 1000.

Referring to FIGS. 4A-4B-4C and method 1000, at an operation 1002, output signals are generated, by a first set of sensors, conveying first information related to operation of the first vehicle. The first set of sensors is carried by the first vehicle. The first information may include first timing information and first operator information. The first timing information associates the generated output signals with one or more first moments of generation by the first set of sensors. The first operator information associates the generated output signals with a first vehicle operator of the first vehicle at the one or more first moments of operation. In some embodiments, operation 1002 is performed by a set of sensors the same as or similar to first set of sensors 52a (shown in FIG. 1 and described herein).

At an operation 1004, the first information is stored, by a first set of resources carried by the first vehicle. In some embodiments, operation 1004 is performed by a set of resources the same as or similar to first set of resources 51a (shown in FIG. 1 and described herein).

At an operation 1006, output signals are generated, by a second set of sensors, conveying second information related to operation of the second vehicle. The second set of sensors is carried by the second vehicle. The second information may include second timing information and second operator information. The second timing information associates the generated output signals with one or more second moments of generation by the second set of sensors. The second operator information associates the generated output signals with a second vehicle operator of the second vehicle at the one or more second moments of operation. In some embodiments, operation 1006 is performed by a set of sensors the same as or similar to second set of sensors 52b (shown in FIG. 1 and described herein).

At an operation 1008, the second information is stored, by a second set of resources carried by the second vehicle. In some embodiments, operation 1008 is performed by a set of resources the same as or similar to second set of resources 51b (shown in FIG. 1 and described herein).

At an operation 1010, output signals are generated, by a third set of sensors, conveying third information related to operation of the third vehicle. The third set of sensors is carried by the third vehicle. The third information may include third timing information and third operator information. The third timing information associates the generated output signals with one or more third moments of generation by the third set of sensors. The third operator information associates the generated output signals with a third vehicle operator of the third vehicle at the one or more third moments of operation. In some embodiments, operation 1010 is performed by a set of sensors the same as or similar to third set of sensors 52c (shown in FIG. 1 and described herein).

At an operation 1012, the third information is stored, by a third set of resources carried by the third vehicle. In some embodiments, operation 1012 is performed by a set of resources the same as or similar to third set of resources 51c (shown in FIG. 1 and described herein).

At an operation 1014, presentation of a user interface to a user is facilitated, by a remote computing server that is separate and discrete from the fleet of vehicles. In some embodiments, operation 1014 is performed by a presentation component the same as or similar to presentation component 21 (shown in FIG. 1 and described herein).

At an operation 1016, input is received from the user through the user interface. The received input represents a distributed query related to the operation of the fleet of vehicles. In some embodiments, operation 1016 is performed by an interface component the same as or similar to interface component 22 (shown in FIG. 1 and described herein).

At an operation 1018, query information is transmitted, at least in part wirelessly, from the remote computing server to a subset of the fleet of vehicles. The subset includes the first, second, and third vehicle. The query information is based on the distributed query. In some embodiments, operation 1018 is performed by a distribution component the same as or similar to distribution component 23 (shown in FIG. 1 and described herein).

At an operation 1020, the query information is received, by a first transceiver included in the first set of resources, from the remote computing server. In some embodiments, operation 1020 is performed by a set of resources the same as or similar to first set of resources 51a (shown in FIG. 1 and described herein).

At an operation 1022, the query information is received, by a second transceiver included in the second set of resources, the query information from the remote computing server. In some embodiments, operation 1022 is performed by a set of resources the same as or similar to second set of resources 51b (shown in FIG. 1 and described herein).

At an operation 1024, the query information is received, by a third transceiver included in the third set of resources, the query information from the remote computing server. In some embodiments, operation 1024 is performed by a set of resources the same as or similar to third set of resources 51c (shown in FIG. 1 and described herein).

At an operation 1026, the distributed query is performed, by the first set of resources, based on the received query information. Performance results in a first set of potential results. In some embodiments, operation 1026 is performed by a query component the same as or similar to query component 24 (shown in FIG. 1 and described herein).

At an operation 1027, the distributed query is performed, by the second set of resources, based on the received query information. Performance results in a second set of potential results. In some embodiments, operation 1027 is performed by a query component the same as or similar to query component 24 (shown in FIG. 1 and described herein).

At an operation 1028, the distributed query is performed, by the third set of resources, based on the received query information. Performance results in a third set of potential results. In some embodiments, operation 1028 is performed by a query component the same as or similar to query component 24 (shown in FIG. 1 and described herein).

At an operation 1029, the first set of potential results is converted, by the first set of resources, to create a first set of results. The conversion is based on a first set of response constraints and first current local data transmission conditions. In some embodiments, operation 1029 is performed by a conversion component the same as or similar to conversion component 38 (shown in FIG. 1 and described herein).

At an operation 1030, the second set of potential results is converted, by the second set of resources, to create a second set of results. The conversion is based on a second set of response constraints and second current local data transmission conditions. In some embodiments, operation 1030 is performed by a conversion component the same as or similar to conversion component 38 (shown in FIG. 1 and described herein).

At an operation 1031, the third set of potential results is converted, by the third set of resources, to create a third set of results. The conversion is based on a third set of response constraints and third current local data transmission conditions. In some embodiments, operation 1031 is performed by a conversion component the same as or similar to conversion component 38 (shown in FIG. 1 and described herein).

At an operation 1032, the first set of results is transmitted to the remote computing server. In some embodiments, operation 1032 is performed by a set of resources the same as or similar to first set of resources 51a (shown in FIG. 1 and described herein).

At an operation 1034, the second set of results is transmitted to the remote computing server. In some embodiments, operation 1034 is performed by a set of resources the same as or similar to second set of resources 51b (shown in FIG. 1 and described herein).

At an operation 1036, the third set of results is transmitted to the remote computing server. In some embodiments, operation 1036 is performed by a set of resources the same as or similar to third set of resources 51c (shown in FIG. 1 and described herein).

At an operation 1038, the first set of results is received by the remote computing server from the first transceiver, the second set of results is received from the second transceiver, and the third set of results is received from the third transceiver. In some embodiments, operation 1038 is performed by a result component the same as or similar to result component 25 (shown in FIG. 1 and described herein).

At an operation 1040, the first, second, and third set of results are aggregated, by the remote computing server, into aggregated results. In some embodiments, operation 1040 is performed by an aggregate component the same as or similar to aggregate component 26 (shown in FIG. 1 and described herein).

At an operation 1042, presentation of the aggregated results is facilitated, by the remote computing server, via the user interface to the user. In some embodiments, operation 1042 is performed by a presentation component the same as or similar to presentation component 21 (shown in FIG. 1 and described herein).

In some implementations, system 100 is configured to use data-processing resources carried by a fleet of vehicles as a distributed data center, system 100 configured to couple with the fleet of at least 5 vehicles, the system comprising elements carried by and/or included in individual ones of the vehicles in the fleet operating jointly with a remote computing server. Individual ones of the vehicles in the fleet include a set of resources for data processing, wherein the set of resources includes a transceiver configured to transfer and receive information to and from the remote computing server. The individual ones of the vehicles in the fleet further include a set of sensors configured to generate output signals conveying information related to operation of each vehicle. The remote computing server is separate and discrete from the fleet of vehicles and includes one or more processors configured to: facilitate presentation of a user interface to a user, which receive input from the user, wherein the received input represents a distributed query related to the operation of the fleet of vehicles; and transmit the distributed query to the fleet. Individual sets of resources included in individual vehicles are further configured to: obtain a set of response constraints; obtain current local data transmission conditions; perform the distributed query for an individual vehicle, resulting in a set of potential results; and convert the set of potential results to create a set of results, wherein conversion is based on the set of response constraints and the current local data transmission conditions. Individual sets of results are transmitted to the remote computing server, which receives and aggregates the individual sets of results, and presents the aggregated results via the user interface to the user.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to use data-processing resources carried by a fleet of vehicles, the system configured to couple with the fleet of vehicles, wherein the fleet includes multiple vehicles, the system comprising:

one or more storage servers including one or more processors, wherein the one or more storage servers are separate and discrete from the fleet of vehicles, wherein the one or more storage servers are configured to electronically store information; and a computing server including one or more processors, wherein the computing server is separate and discrete from the fleet of vehicles, and wherein the one or more processors are configured via machine-readable instructions to:

obtain a query from a user, wherein the query is to be performed on at least one of (a) vehicle-specific sensor data and (b) vehicle-specific information derived from the vehicle-specific sensor data, wherein the vehicle-specific data has been captured by sensors on individual vehicles in the fleet of vehicles;

transmit instructions based on the query to perform the query on at least one of (a) the vehicle-specific sensor data and (b) the vehicle-specific information derived from the vehicle-specific sensor data, resulting in the individual sets of potential results, wherein the individual sets of potential results are constrained to create results based on using one or more sets of response constraints, wherein said constraining of the individual sets of potential results is performed such that an amount of bandwidth required to transmit the results is reduced compared to the individual sets of potential results, and wherein said constraining of the individual sets of potential results is based on at least one of (a) summarizing and/or (b) adjusting a rate of generation and/or capture for at least one of the sensors;

obtain the results from the one or more storage servers; and facilitate a presentation based on the results.

2. The system of claim 1, wherein the query corresponds to one or more particular time frames, wherein performance of the query is limited to the vehicle-specific sensor data that was captured in the one or more particular time frames by the sensors that are carried by the individual vehicles.

3. The system of claim 1, wherein at least part of the one or more sets of response constraints are determined based on the query information.

4. The system of claim 1, wherein performance of the query is limited to a particular vehicle operator.

5. The system of claim 1, wherein the results are received in annotated data packets, wherein the one or more processors of the computing server are further configured to:
   determine whether one or more particular data packets are missing or corrupted, based on annotations in the annotated data packets; and
   responsive to a determination that the one or more particular data packets are missing or corrupted, transmit a request to re-transmit the one or more particular data packets.

6. The system of claim 1, wherein the one or more storage servers are configured by machine-readable instructions to:
   determine a first set of derivative operating information, wherein the first set of derivative operating information is derived from the vehicle-specific sensor data; and
   store the first set of derivative operating information.

7. The system of claim 1, wherein obtaining the query includes receiving the query from the user through a user interface.

8. The system of claim 1, wherein obtaining the query includes effectuating a presentation of a user interface to the user and receiving the query from the user through the user interface.

9. The system of claim 1, wherein the query further instructs to obtain the one or more sets of response constraints.

10. The system of claim 1, wherein at least one of (a) the vehicle-specific sensor data and (b) the vehicle-specific information derived from the vehicle-specific sensor data is stored on the one or more storage servers.

11. The system of claim 1, wherein the individual sets of potential results are stored on the one or more storage servers.

12. The system of claim 1, wherein the presentation is presented to one or more users through one or more user interfaces.

13. A method to use data-processing resources carried by a fleet of vehicles, wherein the fleet includes multiple vehicles, the method comprising:
   storing information electronically, on one or more storage servers;
   obtaining a query from a user, wherein the query is to be performed on at least one of (a) vehicle-specific sensor data and (b) vehicle-specific information derived from the vehicle-specific sensor data, wherein the vehicle-specific data has been captured by sensors on individual vehicles in the fleet of vehicles;
   transmitting instructions based on the query to perform the query on at least one of (a) the vehicle-specific sensor data and (b) the vehicle-specific information derived from the vehicle-specific sensor data, wherein the individual sets of potential results are constrained to create results based on using one or more sets of response constraints, wherein said constraining of the individual sets of potential results is performed such that an amount of bandwidth required to transmit the results is reduced compared to the individual sets of potential results, and wherein said constraining of the individual sets of potential results is based on at least one of (a) summarizing and/or (b) adjusting a rate of generation and/or capture for at least one of the sensors;
   obtaining, by a computing server that is separate and discrete from the fleet of vehicles, the results from the one or more storage servers; and
   presenting the results to one or more users.

* * * * *